United States Patent [19]

Chu

[11] Patent Number: 5,244,645
[45] Date of Patent: Sep. 14, 1993

[54] PROCESS FOR REMOVING NH₃ FROM A LIQUID STREAM

[75] Inventor: Humbert H. Chu, Houston, Tex.

[73] Assignee: Shell Oil Company, Houston, Tex.

[21] Appl. No.: 769,282

[22] Filed: Oct. 1, 1991

[51] Int. Cl.⁵ .................. B01B 1/00; B01D 1/16; C01C 1/242; C01B 25/28

[52] U.S. Cl. .................. 423/310; 159/4.01; 159/48.1; 203/90; 423/313; 423/550

[58] Field of Search ............ 423/356, 310, 313, 549, 423/550; 159/48.1, 4.01; 203/90

[56] References Cited

U.S. PATENT DOCUMENTS

| | | | |
|---|---|---|---|
| 1,962,185 | 6/1934 | Fauser | 159/48.1 |
| 2,856,278 | 10/1958 | Bray et al. | 159/48.1 |
| 2,895,800 | 7/1959 | Otto | 159/48.1 |
| 2,966,396 | 12/1960 | Eaton | 423/356 |
| 3,254,951 | 6/1966 | Kautter et al. | 423/356 |
| 3,382,059 | 5/1968 | Getsinger | 71/34 |
| 3,674,427 | 7/1972 | Welty | 423/356 |
| 3,816,603 | 6/1974 | Welty | 423/356 |
| 4,259,302 | 3/1981 | Katz et al. | 423/237 |
| 4,271,134 | 6/1981 | Teller | 423/238 |
| 4,287,162 | 9/1981 | Scheibel | 423/238 |
| 4,305,748 | 12/1981 | Bechthold et al. | 159/48.1 |
| 4,522,638 | 6/1985 | Karwat | 55/37 |
| 4,662,929 | 5/1987 | Lammi | 71/35 |

FOREIGN PATENT DOCUMENTS

576727 5/1959 Canada .................. 159/48.1

Primary Examiner—Wayne Langel
Attorney, Agent, or Firm—Timothy J. Hadlock

[57] ABSTRACT

This invention is a process for removing $NH_3$ from a $NH_3$-containing liquid stream. The process contains the following steps: (a) passing a $NH_3$-containing first liquid stream, a heated first gaseous stream, and an ammonium salt-containing second liquid stream obtained from step (d) of this process to a spray drying zone thereby spray drying the liquid stream and producing a spray drying zone effluent containing ammonia-containing gas and solid particles containing ammonium salts; (b) passing the spray drying zone effluent to a solid/gas separating means thereby separating and removing at least a portion of the solid particles and thereby producing a second gaseous stream comprising ammonia and entrained solid particles containing ammonium salts; (c) passing the second gaseous stream to a scrubbing zone to scrub the second gaseous stream, at scrubbing conditions, in the presence of an inorganic or organic acid thereby forming a gaseous stream substantially free of ammonia and an ammonium salt-containing liquid stream containing ammonium salts; and (d) passing at least a portion of the ammonium salt-containing liquid stream as the second liquid stream to the spray drying zone.

13 Claims, No Drawings

PROCESS FOR REMOVING NH₃ FROM A LIQUID STREAM

BACKGROUND OF THE INVENTION

1. Field of the Invention

This invention relates to a process for removing ammonia from a liquid stream.

2. Description of the Related Art

Ammonia-containing streams resulting from various chemical processes must be disposed of in an environmentally safe manner. Previously known processes either vented the ammonia to the atmosphere or required disposal of liquid, which is burdensome.

The instant invention has the benefit of converting the ammonia to a solid salt which is easily handled and disposed of.

SUMMARY OF THE INVENTION

The present invention may be summarized as a process for removing $NH_3$ from a $NH_3$-containing liquid stream. The process contains the following steps: (a) passing a $NH_3$-containing first liquid stream, a heated first gaseous stream, and an ammonium salt-containing second liquid stream obtained from step (d) of this process to a spray drying zone thereby spray drying the liquid stream and producing a spray drying zone effluent containing ammonia-containing gas and solid particles containing ammonium salts; (b) passing the spray drying zone effluent to a solid/gas separating means thereby separating and removing at least a portion of the solid particles and thereby producing a second gaseous stream comprising ammonia and entrained solid particles containing ammonium salts; (c) passing the second gaseous stream to a scrubbing zone to scrub the second gaseous stream, at scrubbing conditions, in the presence of an acid stream thereby forming a gaseous stream substantially free of ammonia and an ammonium salt-containing liquid stream containing ammonium salts; and (d) passing at least a portion of the ammonium salt-containing liquid stream as the second liquid stream to the spray drying zone.

OBJECTS AND DESCRIPTION O HE PREFERRED EMBODIMENT(S)

It is an object of this invention to remove the ammonium salts along with other salts in the cyclone, thus eliminating the $NH_3$ emission problem or the ammonia liquor disposal need. An $NH_3$ balance is maintained between the $NH_3$ in the liquid waste feed and the ammonium salts leaving the bottom of the cyclone unit.

The process of this invention is a process for removing $NH_3$ from a $NH_3$-containing liquid stream. At least three unit operations are involved in the process. These unit operations are a spray dryer, a cyclone or other solids-gas separating means, and a scrubber or other liquid-gas contacting means. Any necessary pumps or other means for moving the gas or liquid between unit operations are also included. Each unit operation will have one or more feed streams and one or more effluent streams. Through this process ammonia contained in liquid waste streams from any of various sources at chemical plants and other industrial facilities may be more easily and conveniently removed. Through this process the ammonia may be removed as solid ammonium salts. These solids are then easily and conveniently disposed of.

In a preferred embodiment the process occurs through the following steps. First, an $NH_3$-containing first liquid stream (the waste stream which needs to be cleaned up) is fed to a spray drying zone. The $NH_3$-containing first liquid stream may contain dissolved salts and water. This stream may be at a temperature between 0°–100° C. Optionally, a second liquid stream from the scrubbing zone discussed below may also be fed to the spray drying zone. The feed rate of the combined stream may be between 5-200 gpm. The spray drying zone may be of any conventional type known in the art. A preferred spray drying zone is a spray dryer having a rotating element to atomize the liquid stream. Preferably the rotating element rotates at between about 16,000 to 24,000 revolutions per minute. A heated first gaseous stream is fed to the spray dryer. The heated gaseous stream is preferably air and/or nitrogen. The temperature and the flow rate of the gaseous stream should be sufficient to vaporize and dry all the solids in the liquid streams. The gaseous stream and the spray drying zone are preferably between about 300° and 600° C. The spray drying zone temperature must be less than the decomposition temperature of any ammonium salts in the zone.

The liquid stream or streams fed to the spray dryer are dried. Thus a spray dryer effluent is produced containing a second gaseous stream containing ammonia and entrained solid particles containing dried ammonium salts. These streams preferably exit the spray dryer at between 100° to 140° C. The spray drying zone effluent is then passed to a solid/gas separating means. This separating means is preferably a cyclone. At least some of the solid particles are thus removed from the spray dryer effluent. Removed from the gas-solid separating means is a second gaseous stream or cyclone effluent containing ammonia and those ammonium salts not removed by the separating means. Preferably, the cyclone and feed rates, temperature, and concentration of solids in the drying zone effluent are such that 95% of solids are removed by the cyclone.

This second gaseous stream containing ammonia is fed to a scrubbing zone or contacting means. The scrubbing zone or contacting means is preferably a wet scrubber of any of the conventionally known types such as spray towers, cyclone spray scrubbers, impingement scrubbers, packed-bed scrubbers, fluidized-bed scrubbers, orifice scrubbers, venturi scrubbers, water-jet scrubbers, mechanical scrubbers, and fibrous-bed scrubbers. In the scrubber or contacting means the second gaseous stream is scrubbed, at scrubbing conditions, in the presence of an acid. Suitable acids include sulfuric acid, phosphoric acid, nitric acid, hydrochloric acid and organic acids, etc., preferably sulfuric and phosphoric acid. Suitable scrubbing conditions are temperatures of between 0°–50° C. The quantity and concentration of the acid should be such that it is sufficient to remove substantially all ammonia from the gaseous stream as salts. This scrubbing forms a gaseous stream substantially free of ammonia and an ammonium salt-containing liquid stream or effluent.

The gaseous stream substantially free of ammonia is removed as exhaust. At least some of the ammonium salt-containing liquid stream is then fed to the spray drying zone as a second liquid stream. This stream may be combined with the $NH_3$-containing first liquid stream prior to feeding the streams to the spray drying zone.

In another embodiment the process occurs through the following steps. First, a NH₃-containing and dissolved-salts-containing-feed liquid stream (the waste stream which needs to be cleaned up) is fed to a spray drying zone. The NH₃- and dissolved-salts-containing feed liquid stream may contain water. The temperature of this stream may be as described in the previous embodiment. Optionally, a scrubber effluent liquid stream from the scrubbing zone discussed below may also be fed to the spray drying zone. The spray drying zone may be of any conventional type known in the art. A preferred spray drying zone is a spray dryer having a rotating element to atomize the liquid stream. Preferably the rotating element rotates at between about 16,000 to 24,000 revolutions per minute. A heated feed gaseous stream is fed to the spray dryer. The heated feed gaseous stream is preferably air and/or nitrogen. The gaseous stream and the spray drying zone are preferably between about 300° and 600° C. The spray drying zone temperature must be less than the decomposition temperature of any ammonium salts in the zone. The flow rates to the dryer are as described in the previous embodiment.

The liquid stream or streams fed to the spray dryer are dried. Thus a spray dryer effluent is produced containing a second gaseous stream containing ammonia and entrained solid particles containing dried ammonium salts. These streams preferably exit the spray dryer at between 100° to 140° C. The spray drying zone effluent is then passed to a solid/gas separating means. This separating means is preferably a cyclone. At least some, and preferably at least 95 %wt, of the solid particles are thus removed from the spray dryer effluent. Thus removed from the cyclone is a solids cyclone effluent containing solid ammonium salts and a gaseous stream containing ammonia.

This gaseous stream containing ammonia is contacted with an acid. The contacting preferably takes place in a wet scrubber in the manner described in the previous embodiment. A scrubber effluent liquid stream is produced containing containing dissolved ammonium salts. Also, a gaseous exhaust stream substantially free of ammonia is removed.

The ranges and limitations provided in the instant specification and claims are those which are believed to particularly point out and distinctly claim the instant invention. It is, however, understood that other ranges and limitations that perform substantially the same function in substantially the same way to obtain substantially the same result are intended to be within the scope of the instant invention as defined by the instant specification and claims.

What is claimed is:

1. A process for removing NH₃ from a NH₃-containing fist liquid stream which comprises:
   (a) passing said NH₃-containing first liquid stream, a heated first gaseous stream, and an ammonium salt containing second liquid stream obtained from step (d) of this process to a spray drying zone of between about 300° C. and 600° C. thereby spray drying said liquid stream and producing a spray drying zone effluent comprising ammonia containing gas and solid particles comprising ammonium slats;
   (b) passing said spray drying zone effluent to a solid/-gas separating means thereby separating and removing at least a portion of said solid particles nd thereby producing a second gaseous stream comprising ammonia and entrained solid particles comprising ammonium slats;
   (c) passing said second gaseous stream to a scrubbing zone to scrub said second gaseous stream, at scrubbing conditions, in the presence of an acid thereby forming a gaseous stream substantially free of ammonia and an ammonium salt-containing liquid stream comprising ammonium salts;
   (d) passing at least a portion of said ammonium slat-containing liquid stream containing dissolved ammonium salts as said second liquid stream to said spry drying zone.

2. The process according to claim 1 wherein the spray drying zone feed temperature is rater than about 300 and less than the decomposition temperature of said ammonium salts.

3. The process according to claim 1 wherein the spray drying zone effluent temperature is between about 100° and 140° C.

4. The process according to claim 1 wherein the spraying drying zone comprises an atomizer having a rotating element wherein said rotating element rotates at between about 16,000 to 24,000 revolutions per minute.

5. The process according to claim 1 wherein the first gaseous stream comprises a gas selected for eh group consisting of air, nitrogen, and mixtures thereof.

6. The process according to claim 1 wherein said NH₃-containing fist liquid stream further comprises dissolved salts and water.

7. The process according to claim 1 wherein said acid comprises an acid selected from the group consisting of $H_3PO_4$, $H_2SO_4$, HCN, HCl, organic acids, and mixtures thereof.

8. The process according to claim 1 wherein said solid/gas separating mean is a cyclone.

9. A process comprising:
   (a) passing a feed liquid stream containing ammonia and dissolved salts, at least a portion of a scrubber effluent liquid stream from step (d) containing dissolved ammonium slats, and a feed gaseous stream containing nitrogen and/or air to a spray dryer;
   (b) spray drying said combined stream wherein said spray dryer is operated at a temperature between about 300° C. ad 600° C. thereby producing a spray drying zone effluent containing ammonia and solid ammonium slats;
   (c) feeding said spry dryer effluent to a cyclone thereby separating solids from gas in said spray dryer effluent thereby producing a slids cyclone effluent containing solid ammonium salts and a gaseous stream containing ammonia; and
   (d) feeding said gaseous stream containing ammonia to a scrubber wherein said gaseous stream containing ammonia is contacted with an inorganic or organic acid under conditions such that said ammonia gets with said acid thereby forming ammonium salts and thereby producing said scrubber effluent liquid stream and a gaseous exhaust stream.

10. The process according to claim 9 wherein said spray dryer effluent temperature is between about 100° and 140° C.

11. The process according to claim 9 wherein the spray dryer zone comprises an atomizer having a rotating element wherein said rotating element rotates at between about 16,000 to 24,000 revolutions per minute.

12. The process according to claim 10 wherein said inorganic acid comprises acids selected from the group consisting of $H_3PO_4$, $H_2SO_4$, HCN, HCl, organic acids, and mixtures thereof.

13. A process for producing ammonium salts comprising:
   (1) contacting in a contacting means an ammonia containing gaseous cyclone effluent from step (d) with phosphoric or sulfuric acid wherein ammonium salts are formed and a dissolved-ammonium salts/ammonia-containing liquid effluent is produced,
   (2) passing at least a portion of said dissolved-ammonium salts/ammonia-containing liquid effluent and a heated air or nitrogen stream heated to 300° C. to 600° C. and an ammonia-containing liquid waste stream to a spray dryer comprising an atomizer having a rotating element wherein said rotating element rotates at between 16,000 to 24,000 rpm; spray drying said dissolved-ammonium salts/ammonia-containing liquid effluent and ammonia-containing liquid waste stream thereby producing a dried ammonium salts and ammonia-containing gaseous effluent having a temperature of between 100° and 140° C.;
   (3) passing said dried ammonium salts and ammonia-containing gaseous effluent to a cyclone wherein a portion of said dried ammonium salts are removed and producing an ammonia-containing gaseous cyclone effluent, and
   (4) passing said ammonia-containing gaseous cyclone effluent to said contacting means.

* * * * *